United States Patent
Schmitt et al.

(10) Patent No.: US 10,136,032 B2
(45) Date of Patent: Nov. 20, 2018

(54) METHOD FOR MONITORING A COLOR STANDARD IN A PRINTING MACHINE

(71) Applicant: HEIDELBERGER DRUCKMASCHINEN AG, Heidelberg (DE)

(72) Inventors: Joerg Schmitt, Seeheim-Jugenheim (DE); Nikolaus Pfeiffer, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 15/593,979

(22) Filed: May 12, 2017

(65) Prior Publication Data

US 2017/0339314 A1    Nov. 23, 2017

(30) Foreign Application Priority Data

May 20, 2016    (DE) .................. 10 2016 208 698

(51) Int. Cl.
| | |
|---|---|
| H04N 1/60 | (2006.01) |
| H04N 1/00 | (2006.01) |
| H04N 1/50 | (2006.01) |

(52) U.S. Cl.
CPC ....... H04N 1/6002 (2013.01); H04N 1/00015 (2013.01); H04N 1/00034 (2013.01);
(Continued)

(58) Field of Classification Search
None
See application file for complete search history.

(56) References Cited

U.S. PATENT DOCUMENTS

| | | | |
|---|---|---|---|
| 4,784,060 A | 11/1988 | Weisgerber et al. | |
| 4,852,485 A | 8/1989 | Brunner | |

(Continued)

FOREIGN PATENT DOCUMENTS

| | | |
|---|---|---|
| DE | 3028025 A1 | 2/1982 |
| DE | 102012020911 A1 | 5/2013 |

(Continued)

OTHER PUBLICATIONS

Heidelberger Druckmaschinen AG; Bedienleitfaden zu Prinect Image Control; Prinect Farbe und Qualitaet; Heidelberger Druckmaschinen AG, Heidelberg; Germany; English Abstract.

*Primary Examiner* — Thomas D Lee
(74) *Attorney, Agent, or Firm* — Laurence A. Greenberg; Werner H. Stemer; Ralph E. Locher

(57) ABSTRACT

A method monitors a color standard for a machine for processing printing material. The color standard results from various parameters of the printing operation and correspondingly associated set points. The color standard may be modified and individually adapted to every machine. The machine is equipped such that current values of the parameters of the color standard are measured and forwarded to a computer. The computer compares these values and predefined set points of the color standard, and based on this information, makes an assessment of the color and quality level achieved in the printing operation. The computer outputs control signals based on the monitoring. The control signals influence the machine control and/or the determining of the current values of the parameters of the color standard in a feedback loop. The color standard is modifiable by the operator by a different selection and weighting of the parameters and the set points.

7 Claims, 4 Drawing Sheets

(52) U.S. Cl.
CPC ..... *H04N 1/00061* (2013.01); *H04N 1/00082* (2013.01); *H04N 1/50* (2013.01); *H04N 1/603* (2013.01); *H04N 1/6036* (2013.01)

(56) References Cited

U.S. PATENT DOCUMENTS

| | | | |
|---|---|---|---|
| 8,873,105 | B2 | 10/2014 | Elter et al. |
| 2003/0156299 | A1 | 8/2003 | Martinez et al. |
| 2012/0145020 | A1 | 6/2012 | Knauer et al. |
| 2013/0120775 | A1* | 5/2013 | Elter ................... H04N 1/60 358/1.9 |
| 2013/0250322 | A1* | 9/2013 | Kawabata ............ H04N 1/60 358/1.9 |
| 2017/0318194 | A1* | 11/2017 | Chen ................... H04N 1/6027 |

FOREIGN PATENT DOCUMENTS

| | | | |
|---|---|---|---|
| EP | 0196431 | A2 | 10/1986 |
| EP | 1302317 | A2 | 4/2003 |
| EP | 2418083 | A1 | 2/2012 |

\* cited by examiner

METHOD FOR MONITORING A COLOR STANDARD IN A PRINTING MACHINE

CROSS-REFERENCE TO RELATED APPLICATION

This application claims the priority, under 35 U.S.C. § 119, of German application DE 10 2016 208 698.7, filed May 20, 2016; the prior application is herewith incorporated by reference in its entirety.

BACKGROUND OF THE INVENTION

Field of the Invention

The invention relates to a method for monitoring a color standard for a machine for processing printing material by a computer.

The technical field of the invention is the field of automated quality control.

In the printing industry, it has always been necessary to monitor print quality achieved during a printing operation in order to be able to intervene if deviations from the desired print result occur. In the simplest case, the operator in charge from time to time visually inspects the print results in terms of quality while a print job is being processed. Since this is no longer sufficient at the high production speed of modern printing machines and in particular considering high quality requirements, many quality control systems for printed products have developed in the past few years. For instance, a common method is to print what are known as print control strips next to the actual print image onto the printing substrate and to scan and evaluate these print control strips after printing. This evaluation may be done manually by the operator with the aid of mobile measuring devices such as densitometers. Alternatively or additionally, it may be carried out in an automated way by image inspection systems. These image inspection systems may be disposed inside the printing machine or outside the printing machine. While the printing machine is in operation to process a print job, the image inspection system inspects the print control strips, immediately realizing deviations from actually desired colors and informing the color control system running on the machine control unit of the printing machine. Based on these systems, a variety of methods and devices for implementing color control to attain the best possible high-quality print result have become known in the art.

U.S. patent publication No. 2003/0156299 A1 for instance discloses a color control method wherein a proof of the achieved print quality is implemented by means of two respective sets of one-dimensional color density profiles for the image inspection system, and wherein an assessment of the achieved print result may be made by comparing the first and second achieved sets of color density profile values.

Published, European patent application No. EP 0 196 431 A2, corresponding to U.S. Pat. No. 4,852,485, additionally discloses a method, a control device, and an auxiliary device for achieving uniform printing results on a multicolor printing machine wherein in addition to solid densities and/or screen dot sizes, selected relations between solid densities and screen dot sizes of different colors are determined repeatedly on measuring patches simultaneously printed within the color zones. When the determined values exceed tolerances associated therewith, a corresponding corrective intervention is made in the printing process by operating the actuating elements of the inking units.

Thus for printing machines with an internal color control system, a unit-dependent and zonal indication of color-related measured values in an overview screen is known. Deviations from a desired printing standard are indicated to the operator by colored highlighting on a display of the control unit of the printing machine. In particular while the printing machine is being set up and when the color situation is difficult, the operator may be overwhelmed by too much information. To assess the achieved color and quality level on the basis of the large variety of information, an operator therefore needs to rely on extensive experience and expertise. In addition, in particular during set-up, the operator continuously needs to monitor the relevant the representation of the relevant measured values on the display.

Thus to simplify the set-up process of the printing machine and to make the job of machine operators, especially inexperienced ones, so much easier, it would be extremely advantageous if the color control system provided the operator with a targeted summary and an assessment of the achieved print quality.

Such a system is known from the prior art. However, in this system, the assessment of the achieved printing result is based on a pre-defined standard and whose composition in terms of the assessed parameters is unknown to the operator. Thus from the point of view of the operator, the system is a black box whose judgment must be accepted without question and whose standard used for the assessment is unchangeable. Thus no adaptation to specific printing machines having specific requirements, and to specific requirements of the executing print shop itself, may be taken into consideration in the system that is known from the prior art.

SUMMARY OF THE INVENTION

Thus an object of present invention is to provide a method for monitoring a color standard for a machine for processing printing material, the method allowing the color standard that is used to be handled flexibly in a way adapted to the used machinery.

The object is attained by a method for monitoring a color standard for a machine for processing printing material by a computer wherein the color standard results from various parameters of the printing operation and correspondingly associated set points. The color standard to be monitored may be modified and individually adapted to every used machine, and the machine is equipped in such a way that current values of the parameters of the color standard are measured and forwarded to the computer. The computer compares these values and the predefined set points of the color standard, and based on this information, the computer makes an assessment of the color and quality level achieved in the printing operation. The computer outputs control signals as a function of the results of the monitoring, the control signals influencing the machine control and/or the determining of the current values of the parameters of the color standard in a feedback loop. The color standard is modifiable by the operator in the form of a different selection and weighting of the parameters and the associated set points thereof. The individual adaptation of the color standard to the used machines as well as the general modifiability of the color standard allow the operator to create corresponding customer-specific standards for controlling the quality of the print jobs. Then in the course of the quality control process, the system informs the operator whether the printing operation is still within the modified printing standard and color standard the operator has personally set himself. As the operator has full control over the refined color standards, a color standard change is possible at any time. Since the parameters of the color standard are furthermore known, they may be displayed to the operator on a display in a targeted way, in particular if individual parameters exceed their corresponding associated thresholds. This provides a much more flexible and transparent quality control for color control purposes in printing machines than the prior art. An operator may modify the applied color standard in such a way that in addition to adjusting the associated set points for the measured color values of the actual color control, he may also select the parameters to be considered in the automated assessment of the achieved print quality. This means that the parameters may be switched on and off. In addition, the parameters may be weighted in a corresponding way. Whether switching off central parameters of the applied color standard makes sense is a different question. Preferably, however, the system will warn the operator if he deactivates an important parameter that is essential to any accurate functioning of a meaningful assessment of the achieved print result.

Advantageous and thus preferred further developments of the present invention will become apparent from the associated dependent claims as well as from the description and the associated drawings.

A preferred further development of the method of the invention in this context is that the parameters of the printing operation include measurement values to be established in terms of solid tones, tone values, and printing material, but also information on the machine status and the current phase in the printing process. An important aspect of the method of the invention in this context is that the assessment factors in not only the parameters of the printing operation relating to the color values measured by the image inspection system but also information on the machine status and in particular on the current phase in the printing operation. If the printing press is in the set-up phase, for instance, to save time and in particular reduce waste, the system may automatically initiate the actual production run when it realizes that the desired color standard has been achieved.

A further preferred further development of the method of the invention in this context is that the assessment of the color and quality level achieved in the printing operation is displayed on a machine control display connected to the computer to indicate the achieved print quality. The assessment of the color and quality level made by the computer based on the knowledge of the color control results as well as the machine statuses and the current printing phase is indicated to the operator in a corresponding way on a display connected to the control unit.

A further preferred further development of the method of the invention in this context is that the indication of the achieved print quality contains a total overview of the machine including a traffic light indicator system of the achieved print quality. To provide the operator with a brief and to-the-point summary of the achieved print quality in terms of the color standard he selected and modified, a total overview of the used machine is displayed on the display, providing a summary of the achieved quality result. This total overview includes a traffic light indicator system for the achieved print quality. The colors of the traffic light system preferably correspond to the commonly known colors of traffic lights in daily life; i.e. red indicates that the tolerances defined for the parameters in the color standard have been exceeded to a considerable extent, green indicates that the values or tolerances are met, and yellow indicates a slight deviation. Alternatively, yellow may indicate that the values are approaching the tolerances or that the values are slightly above or below the tolerances.

A further preferred further development of the method of the invention in this context is that the indication of the achieved print quality includes a detailed indication of the achieved print quality in every printing unit of the machine. In addition to displaying the total overview of the achieved print quality, a further illustration provides the operator with a more detailed indication of a printing unit he has selected. In this context again a traffic light indicator system may be used for the individual printing units; additionally or alternatively, the correspondingly measured color values may be displayed. The selection of the displayed parameter values is configurable.

A further preferred further development of the method of the invention in this context is that the control signals include signals to the machine control unit in terms of the good-sheet counter, the waste deflector, and the printing speed as well as output signals of all other peripheral devices such as signal lamps or strip feeder. For a more efficient processing of the print job, the method of the invention includes a feedback loop to the control unit of the printing machine. This for instance refers to the good-sheet counter: when the quality control result is positive during the set-up printing phase of the machine, a signal is output to the good-sheet counter to indicate the start of the production run. This would normally be done manually by the operator, but automated processing is much more efficient. The same applies to feedback loops concerning signals to the bad sheet deflector or the current printing speed. Output signals to peripheral devices such as a signal lamp, which may indicate an insufficient print quality in a much more efficient way than a mere indication on the display could, are also part of the method of the invention.

A further preferred further development of the method of the invention in this context is that when the values of the parameters of the color standard are measured, the measurement location and the color density are established. Most color control systems for quality control known in the prior art mainly establish color density values. In the method of the invention, however, the color location is established in the measurement of the parameters of the color standard. This allows the achieved print quality to be assessed much more accurately than if only color density values are established.

A further preferred further development of the method of the invention in this context is that in addition to being displayed on the machine control display connected to the computer, the information an assessment of the color and quality level achieved in the printing operation are saved in a protocol in a data memory connected to the computer. In accordance with the method of the invention, the results of the assessment are additionally saved in a data memory to provide long-term documentation of the processed print job. This makes sense especially if the operator cannot be at the display all the time for a live monitoring of the process.

Other features which are considered as characteristic for the invention are set forth in the appended claims.

Although the invention is illustrated and described herein as embodied in a method for monitoring a color standard in a printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advan-

DETAILED DESCRIPTION OF THE INVENTION

Figure 4:
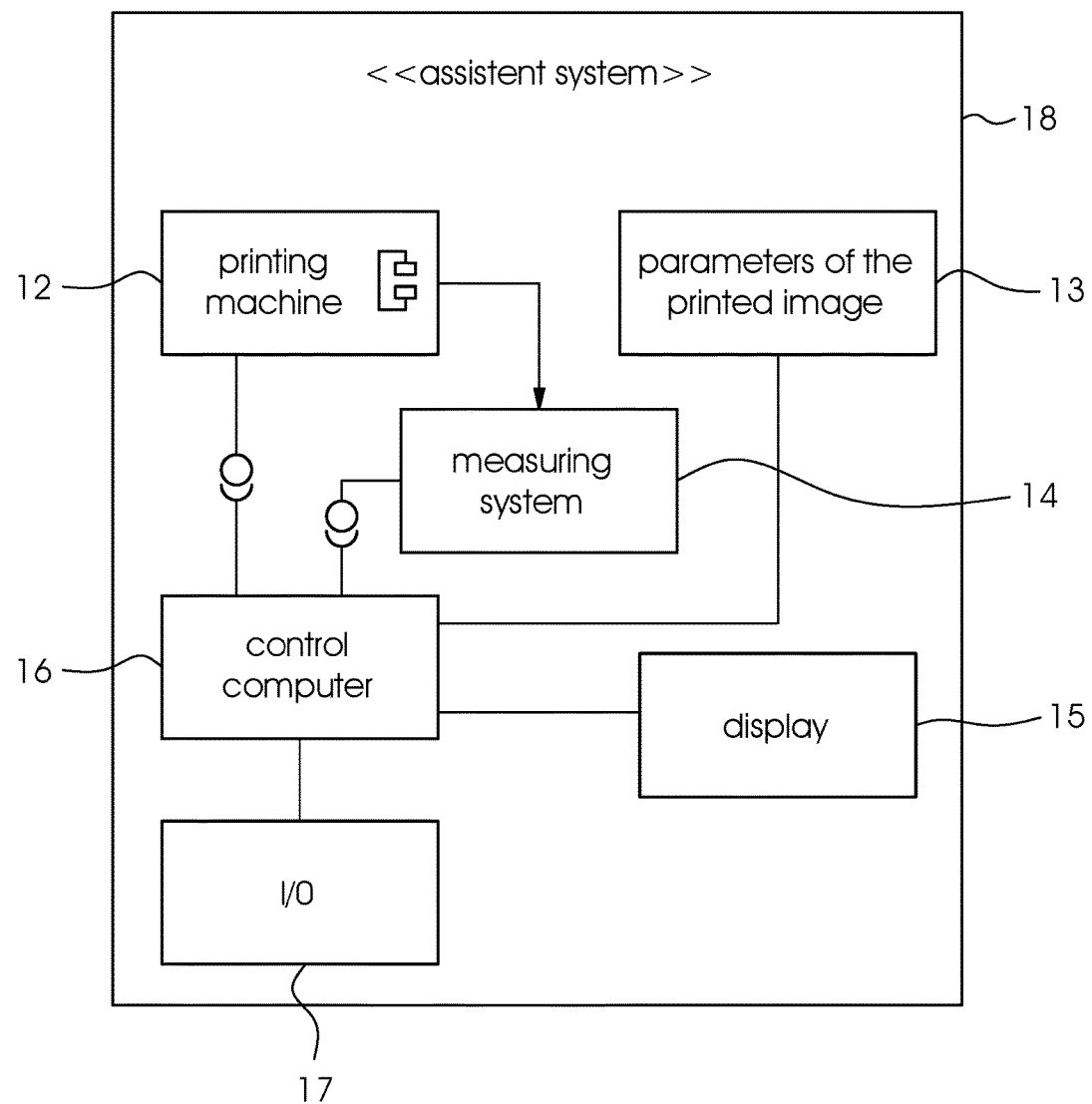
FIG. 4 is a block diagram of a quality measuring system.

Referring now to the figures of the drawings in detail and first, particularly to FIG. 4 thereof, there is shown an assistance system 18 for implementing a method according to the invention. The system 18 consists of a printing machine 12 whose print quality is to be monitored and a control unit 16 of the printing machine. The assistance system 18 can also run on the control unit 16 software applications. The control unit 16 is connected to input devices 17 and a display 15. In a preferred embodiment, the control unit 16 and the display 15, as well as the input devices 17 may be integrated into the printing machine 12 as a control console. A database 13 for saving parameters 5, 6, 7 for a color standard 9 to be used by the assistance system 18 is additionally connected to the control unit 16. The database 13 may be saved both in the memory of the control unit 16 and in an external memory that is plugged into the control unit 16 in the form of a mobile data carrier or is connected to the control unit 16 by a network. A color measuring system 14 is furthermore part of the printing machine 12 and connected thereto. The color measuring system 14 provides the control unit 16 with measured values 10 pertaining to the achieved print quality of printed products that have been produced using the printing machine 12.

Figure 1:
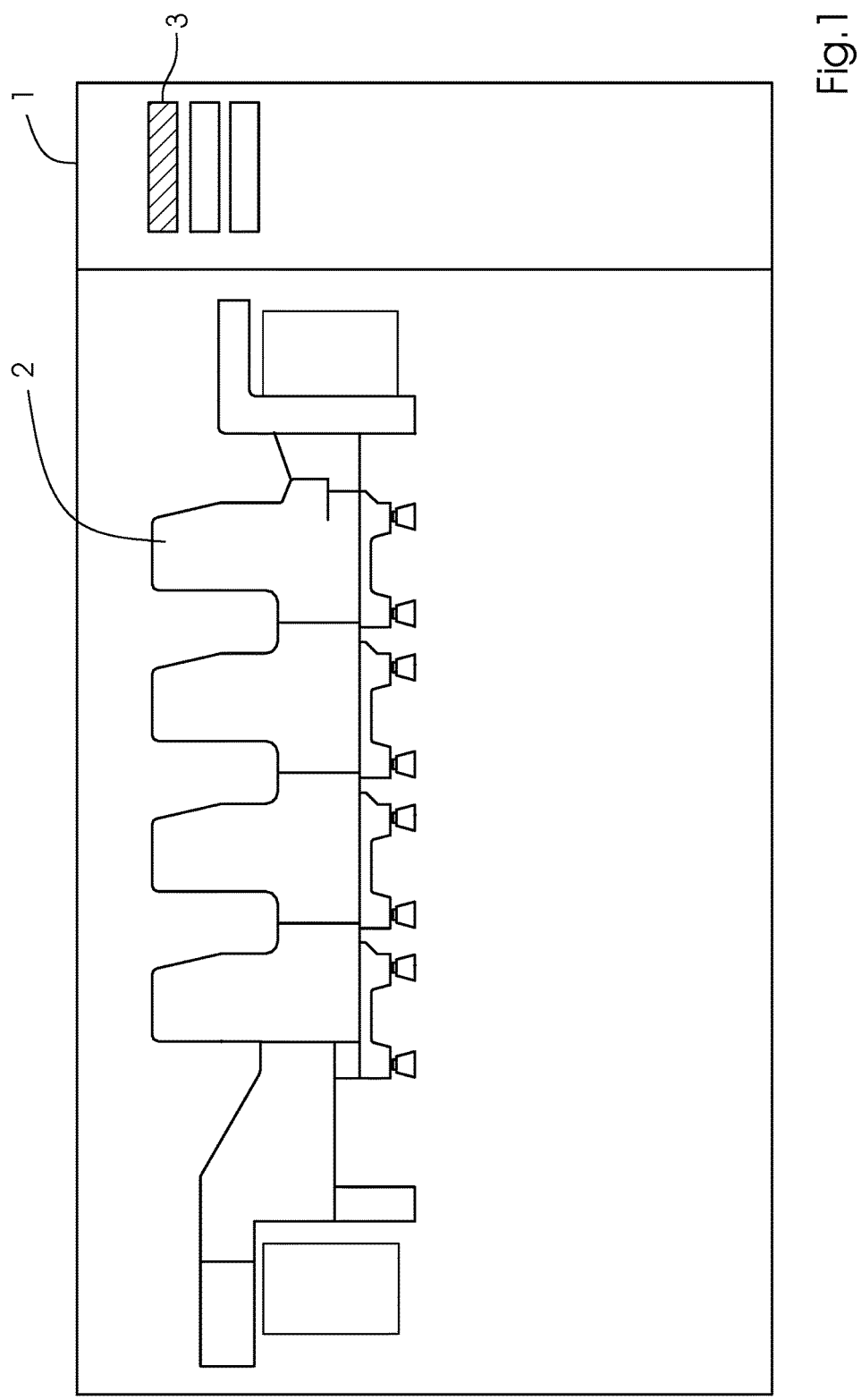
FIG. 1 is an illustration of an example of a displayed total overview of an achieved quality result.
Figure 2:
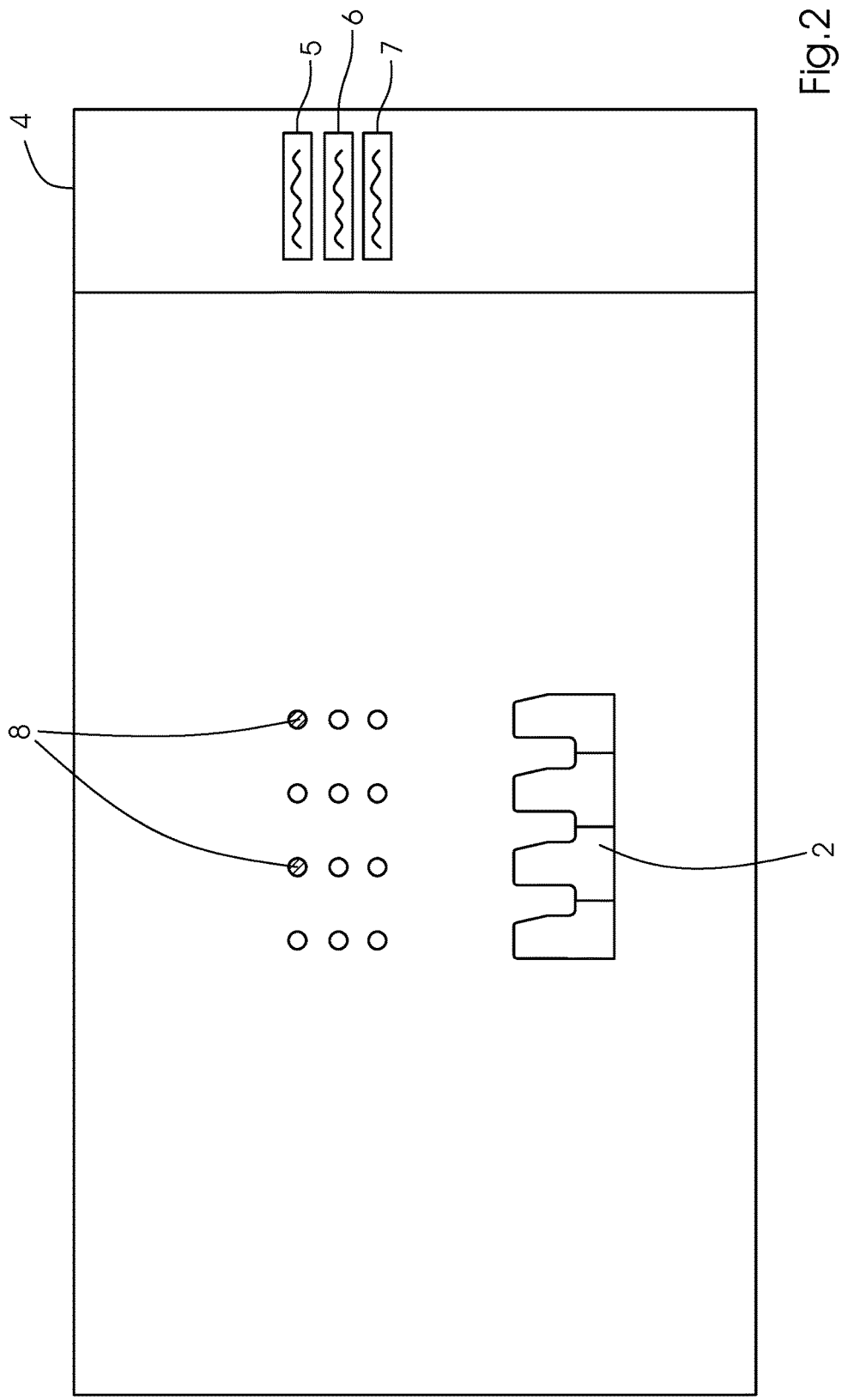
FIG. 2 is an individual representation of printing units in terms of an achieved printing result.
Figure 3:
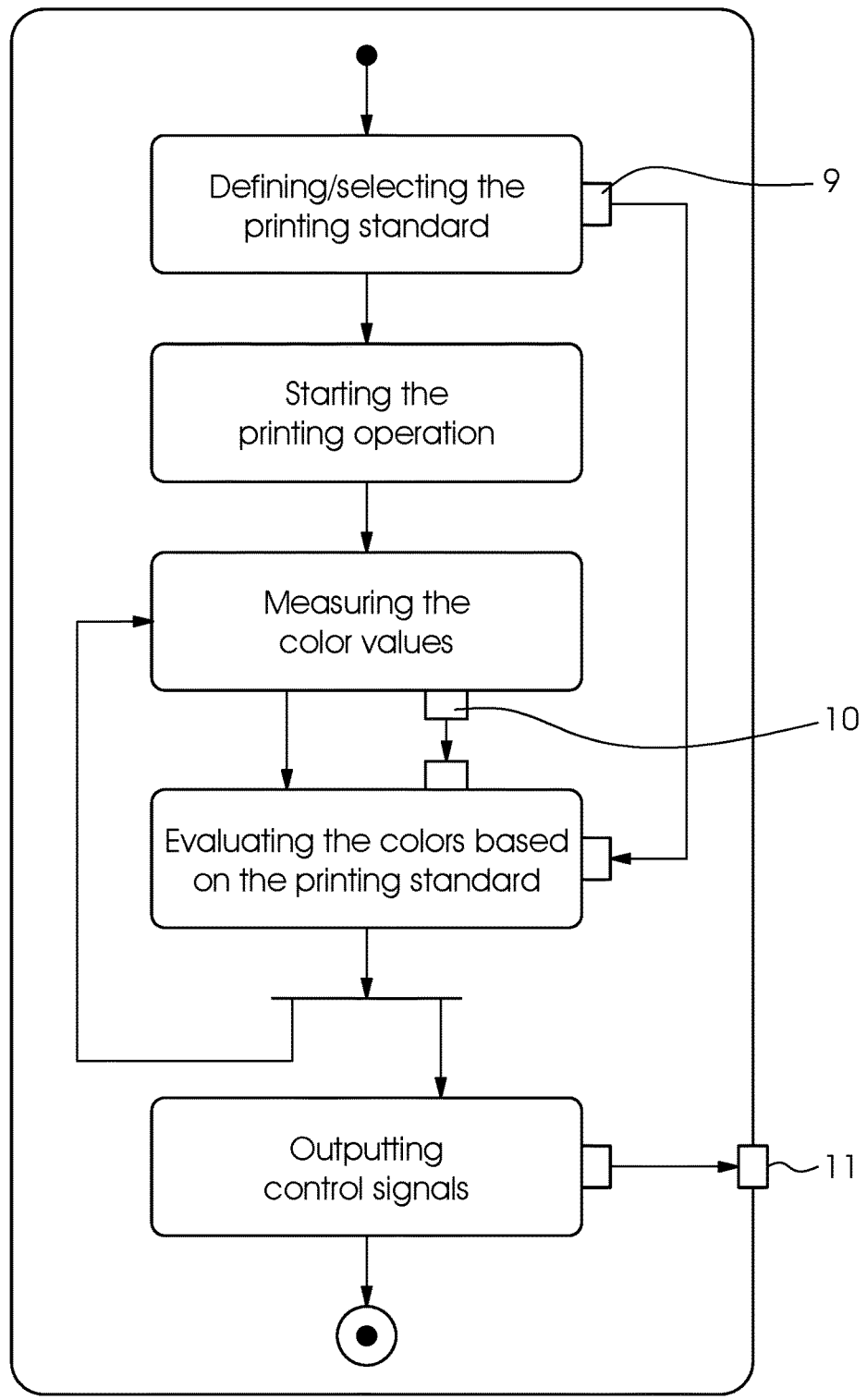
FIG. 3 is a flow chart of a method of the invention.

A flow chart of the preferred embodiment of the method of the invention is furthermore shown in FIG. 3. In a first step, the operator selects the printing standard or color standard 9 to be applied to the current print job and, if necessary, modifies it. The color standard 9 may be a color standard that is invariably defined and is for instance used for every print job in the print shop in question, or a fixed color standard 9 for the printing machine that will be used, or an individual color standard 9 that the operator has specifically created for the current print job. The next step is to start the set-up phase of the printing machine 12, in which usually printed products are produced and the set-up parameters 5, 6, 7 of the machine 12, in particular in terms of color control settings, are modified until the desired color standard 9, i.e. the desired print quality, is achieved. In this process as well as in the subsequent actual production run, the measuring system 14 determines the achieved print quality and forwards the measured values 10 to the control unit 16, which implements the actual color control operations. The assistance system 18, which is likewise active on the control unit 16 as a software application, then evaluates the measured values 10 that have been established to assess the current print quality as part of the color control operation and provides a corresponding assessment of the print quality that is currently being achieved as a function of the current machine statuses, which provides information on whether the applied color standard 9 has already been achieved. Input variables for this process are above all the values 10 established by the measuring system 14 in terms of the parameters for solid tones 7, tone values 6, and printing material 5. If in terms of color control the values thereof are within a maximum additional deviation tolerance defined by the set points provided by the color standard 9, the color standard 9 is deemed to be met. In order to be able to display this to the operator in a correspondingly efficient way, there is a central control element that acts as an indicator of a current status 1 and as a point of entry into the corresponding individual views 4. The indication of the current status 1 is shown in FIG. 1, which is a total overview 1 schematically indicating the construction of the printing machine 2 and indicating considerable deviation from the set points in red and less pronounced deviations in yellow in the manner of a traffic light system as a main color statement to be used by the operator. If the measured values 10 are within the tolerances, they are indicated in green. The precise setting when to use red and yellow may be modified and defined by the operator. In addition, there are detailed views 4 providing a closer look at the individual results 5, 6, 7 of the individual printing units in terms of the achieved colors. FIG. 2 is an example of such a detailed view 4. Here, a traffic light indicator system is likewise used to display the individual parameters of paper white 5, i.e. printing material, tone values 6, and solid tone values 7 for the individual printing units. A selection of these buttons allows the operator to get a quick printing-unit-specific overview of deviations from the intended color standard 9 that may have occurred. This view is a point of access to even further detail views. In addition, this view allows the operator to change the job-related tolerance profile, i.e. to modify the corresponding set points if this was to become necessary to complete the current print job. For the newly defined set points, it is the operator's decision which color level is sufficient for the job. Since the control unit 16 on which the assistance system 18 runs as a software application has a corresponding database 13, these changes the operator made may be saved, allowing the newly created color standard 9 to be saved for future reuse.

The control unit 16 of the printing machine 12 is additionally capable of outputting output signals 11 to various peripheral devices 17. For instance, a signal may be forwarded to a signaling lamp to activate the latter in order to activate the traffic light indicator system 3 to alert the operator to the fact that relevant or less relevant deviations from the applied color standard 9 have occurred. In a case in which the desired color standard 9 has been achieved, a signal may additionally be output to the good-sheet counter to signal an end to the set-up phase in which waste was produced and to transition to the production run for completing the print job.

The following is a summary list of reference numerals and the corresponding structure used in the above description of the invention:

1 total overview of the current quality status
2 schematic representation of the printing machine
3 display field including traffic light indicator system
4 detailed individual representation
5 individual parameter: paper white
6 individual parameter: tone values
7 individual parameter: solid tone
8 traffic light system to indicate assessment of individual parameters in every printing unit
9 printing/color standard
10 measuring result for achieved color values
11 control signal output 12 printing machine
13 set of parameters for a desired printed image
14 measuring system for the printing result
15 display
16 control computer of the printing machine
17 input/output devices
18 software-based assistance system

The invention claimed is:

1. A method for monitoring a color standard for a machine for processing printing material by means of a computer, the color standard resulting from various parameters of a printing operation and correspondingly associated set points, the color standard to be monitored may be modified and individually adapted to every used machine, which comprises the steps of:

measuring and forwarding current values of the various parameters of the color standard to the computer;

comparing, via the computer, the current values and the associated set points of the color standard;

making, via the computer, an assessment of a color and quality level achieved in the printing operation based on information of a comparison;

outputting control signals, via the computer, in dependence on results of the assessment;

using the control signals for at least one of influencing machine control or for determining the current values of the various parameters of the color standard in a feedback loop;

modifying the color standard via an operator in a form of a different selection and weighting of the various parameters and the associated set points thereof;

wherein the various parameters of the printing operation contain both measurement values to be established in terms of solid tones, tone values, and printing material, and information on a state of the machine and a current printing phase.

2. The method according to claim 1, which further comprises displaying the assessment of the color and quality level achieved in the printing operation on a machine control display connected to the computer to indicate an achieved print quality.

3. The method according to claim 2, wherein an indication of the achieved print quality contains a total overview of the machine including traffic light color indication of the achieved print quality.

4. The method according to claim 2, wherein an indication of the achieved print quality includes a detailed indication of the achieved print quality in every printing unit of the machine.

5. The method according to claim 1, wherein in addition to being displayed on a machine control display connected to the computer, information on the assessment of the color and quality level achieved in the printing operation is also saved in a protocol in a data memory connected to the computer.

6. A method for monitoring a color standard for a machine for processing printing material by means of a computer, the color standard resulting from various parameters of a printing operation and correspondingly associated set points, the color standard to be monitored may be modified and individually adapted to every used machine, which comprises the steps of:

measuring and forwarding current values of the various parameters of the color standard to the computer;

comparing, via the computer, the current values and the associated set points of the color standard;

making, via the computer, an assessment of a color and quality level achieved in the printing operation based on information of a comparison;

outputting control signals, via the computer, in dependence on results of the assessment;

using the control signals for at least one of influencing machine control or for determining the current values of the various parameters of the color standard in a feedback loop;

modifying the color standard via an operator in a form of a different selection and weighting of the various parameters and the associated set points thereof;

wherein the control signals contain signals to machine control in terms of a good-sheet counter, waste deflector, and printing speed, as well as further output signals to further periphery devices including signal lamps or strip inserters.

7. A method for monitoring a color standard for a machine for processing printing material by means of a computer, the color standard resulting from various parameters of a printing operation and correspondingly associated set points, the color standard to be monitored may be modified and individually adapted to every used machine, which comprises the steps of:

measuring and forwarding current values of the various parameters of the color standard to the computer;

comparing, via the computer, the current values and the associated set points of the color standard;

making, via the computer, an assessment of a color and quality level achieved in the printing operation based on information of a comparison;

outputting control signals, via the computer, in dependence on results of the assessment;

using the control signals for at least one of influencing machine control or for determining the current values of the various parameters of the color standard in a feedback loop;

modifying the color standard via an operator in a form of a different selection and weighting of the various parameters and the associated set points thereof;

wherein when the current values of the various parameters of the color standard are measured, both a color location and a color density are determined.

* * * * *